Nov. 24, 1959  N. A. WRIGGLESWORTH  2,914,660
ILLUMINATORS
Filed June 12, 1957
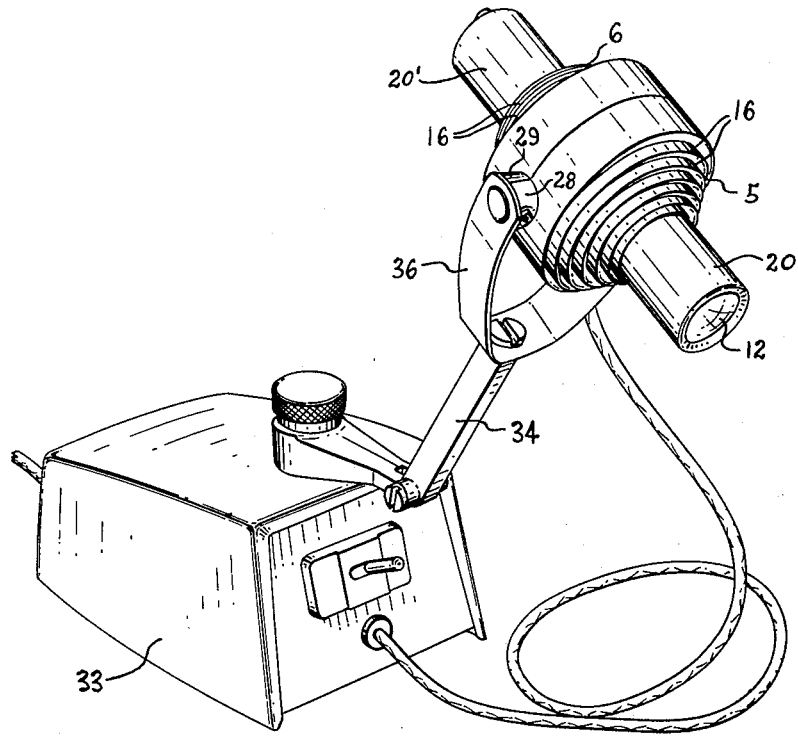
Fig. 1
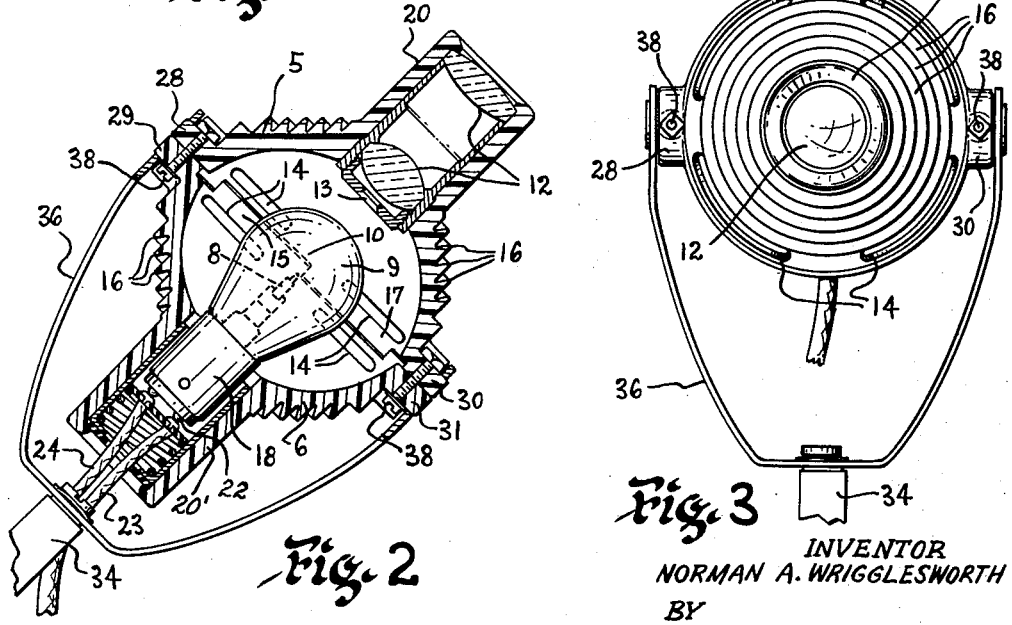
Fig. 2
Fig. 3
INVENTOR
NORMAN A. WRIGGLESWORTH
BY
Herbert C. Kimball
ATTORNEY

United States Patent Office 2,914,660
Patented Nov. 24, 1959

2,914,660
ILLUMINATORS

Norman A. Wrigglesworth, Buffalo, N.Y., assignor to American Optical Company, Southbridge, Mass., a voluntary association of Massachusetts Application June 12, 1957, Serial No. 665,360

4 Claims. (Cl. 240—41)

This invention relates to illuminators and more particularly illuminators for use with microscopes and providing a spot of diffuse light of uniform intensity.

An object of the invention is to house a light source in a two-part housing having its inside surface hightly reflecting so as to increase the illumination.

A further object is to provide an economical housing in two interfitting parts, both of which parts may be molded in the same mold as they are identical. This object is carried out according to my invention by using an integral extension of the housing, in one instance for mounting the condensing lens system and in the other instance for housing the base and other electrical fittings of the electric light source. Furthermore the housing is provided with cooling fins of such shape that the outer mold may be withdrawn in a direction parallel to the axis of the integral extension.

Further objects will become apparent in the course of the description of a preferred embodiment shown in the drawings in which Fig. 1 is a perspective view of the illuminator;

Fig. 2 is a sectional view, the section being taken through the poles of the housing;

Fig. 3 is a face view looking axially into the condensing lens system.

The present invention deals with illuminators of more general application than the specialized illuminators required for filling the aperture of a microscope with sufficient illumination for observation with high magnification. The present invention relates to a microscope illuminator which provides a spot of diffuse light of uniform intensity, and which may as readily be directed on an opaque object from above as through a translucent or transparent object. Such illumination has a less clearly defined focal plane than with Köhler illumination where there is a plane in which the filament of the lamp is imaged. It is important, however, that an efficient illuminator be used without resorting to so powerful a lamp as to cause discomfort and even burns from the heat disseminated.

In accordance with my invention the inside walls of the housing for the lamp source contribute considerably by reflection to the amount of illumination available, and at the same time there is no unevenness in the spread of the light so that "hot spots" are avoided. As is apparent from Fig. 2, I fashion the housing in two mating members 5 and 6, each of which is slightly less than a hemisphere. The center of curvature of the inside surface of housing member 5 is approximately at the filament 8 of the lamp 9, while the center of curvature of the inside surface of housing member 6 is symmetrically positioned at 10. Light is reflected by the inside surface of member 5 so as to spread evenly over the inside surface of member 6. A part of the light reflected from the inside surface of member 6 and a part of the direct light from the light source 8 passes out through the condensing lens system 12. There is a symmetrical arrangement of the reflecting surfaces of the two members 5 and 6, so that even though a part of the light is reflected several times, upon issuing through the condensing lens system 12 it contributes toward the uniformity of the illumination. The aperture 13 further contributes to this uniformity of illumination. It should first be noted that the aperture 13 is placed with relation to the center of curvature of the reflecting interior surface of member 6 so as to be at the minimum cross-section of the bundle of light reflected from that surface. It should also be noted that the aperture 13 is made small enough to permit only the concentrated bundle of reflected light to pass, and to exclude surrounding stray reflected light. The lens system 12 is designed to image the aperture 13 at a good working distance, for instance, seven inches from the front lens of the system 12. These features promote the uniformity of the spot of light which is characteristic of my improved illuminator.

Plastics may be molded with surfaces whose ability to reflect increases according to the degree of polish of the mold. Furthermore, molding is an economical method of producing the housing member 5 and 6 since in this way the lamp housing, the two extensions for mounting the lens system 12 and the base of the lamp 9 respectively, and the trunnions for supporting the illuminator can be molded with a minimum of expense. To increase the reflectance of the inside surfaces of the members 5 and 6 I prefer to coat them with aluminum. This metal reflects not only the relatively short rays which are visible light rays but also the longer rays which are heat rays. Some of the heat must be relieved from the housing, as it does not all pass out through the lens system. For this purpose ventilating slits 14 are formed in members 5 and 6 near the equator as shown in Figs. 2 and 3 for the exit of heated air, and numerous exterior fins 16 are formed on members 5 and 6 to expedite the dissipation of heat from the housing.

These fins 16, as well as the tubular extensions 20 and 20' at the two poles of members 5 and 6, are designed with economy in the production of the housing in mind. The two members 5 and 6 are identical, even to the interfitting projections 15 and 17 at their mating edges, and because of this both members can be molded in the same mold. The fins 16 are integrally formed as annuli extending substantially parallel to the polar axis. As the integral tubular extension 20 or 20' is also substantially parallel to this axis, the outer or female portion of the mold may be withdrawn from member 5 or 6 in a direction parallel to this same axis. The interfitting projections 15 and 17 take any shearing stresses off the bolts connecting the members 5 and 6. Because these projections 15 and 17 do not extend to the outside of the housing (see Fig. 1), the resulting rabbeted construction prevents leakage of light at these mating edges. These features greatly simplify and accordingly cheapen the manufacturing expense of the housing.

The base 18 of the lamp 9 is mounted in the integral tubular extension 20' of the housing member 6. The contacts 22 of the lead-in wires 23 and 24 are spring pressed against the base 18 so that the lamp's position in the housing may be adjusted for uniform maximum light output. To fix this position when so adjusted, the base 18 may be cemented in the tubular extension 20'.

The tubular extension 20 of the housing member 5 houses the condensing lens system 12. In the present instance this lens system is made up of two spaced convergent elements of which the one nearest the light source is considerably more powerful. The system as so designed images the aperture 13 which is intensely illuminated by reflection from the aluminized inside surfaces of the housing. The resulting spot of light is remarkably diffuse and of uniform intensity when it is directed upon a specimen or the like.

At the mating edge of each housing member are two diametrically opposite protuberances. A pair of protuberances 28 and 29, one on each housing member, make up one trunnion and the other pair 30 and 31 make up the other trunnion by which the illuminator may be mounted for pivoting. A desirable stand is shown in the drawings, having a base 33 to which an arm 34 is pivoted. A fork 36 is hinged to the arm 34 so as to swing the illuminator up or down. Each branch of the fork 36 has an opening for receiving one of the trunnions. A bolt 38 is passed through each of the trunnions to draw the two protuberances together and hold the members 5 and 6 assembled.

As previously mentioned, molding the two mating members of the illuminator housing out of plastic works for economy in manufacture, as the smooth inner surfaces of members 5 and 6 are cheaply obtained, and the fins 16 and the tubular extensions 20 and 20' are molded integral with these members. Moreover, but a single mold is required as members 5 and 6 are identical. The illuminator resulting from the foregoing improvements is remarkably compact, and the quality of illumination obtained is excellent where a diffuse spot of light is desired.

The present application is a continuation-in-part of my copending application Serial No. 606,770 filed August 82, 1956, now abandoned.

I claim:

1. An illuminator comprising two identical members molded from plastic material and mating to form a housing, the inside surface of each being highly reflecting, each member being approximately hemispherical and having at its pole an integral tubular extension, said members being molded with identical rims, with integral extensions of said rims formed at diametrically opposed points to provide mating halves of trunnions, means for holding said rims in engagement with each other, a condensing lens system mounted in the tubular extension of one of said members and an electric lamp having its base mounted in the tubular extension of the other member and its filament approximately at the center of curvature of the first mentioned member, and a stand pivotally mounting the combined half trunnions.

2. An illuminator comprising a housing molded from plastic material as two identical members each being approximately hemispherical and having at its pole an integral tubular extension, said identical members being molded with mating rims having identical interfitting projections and each rim having integrally molded halves of trunnions extending outwardly at diametrically opposed points, a stand pivotally mounting the combined half trunnions, a condensing lens system mounted in the tubular extension of one of said members and an electric lamp having its base mounted in the tubular extension of the other member and its filament approximately at the center of curvature of the first mentioned member.

3. An illuminator comprising a housing molded from plastic material as two identical members each being approximately hemispherical and coated on its interior surface with a highly reflecting coating, each member having molded at its pole an integral tubular extension, a lens system mounted in the tubular extension of one of said members, an electric lamp having its base mounted in the tubular extension of the other member, said members being molded with identical mating rims, each rim having integrally formed therewith two half trunnions located diametrically opposite each other, securing means for holding said rims in mating engagement and combining the respective half trunnions, and a stand pivotally mounting the combined half trunnions.

4. An illuminator comprising a housing molded from plastic material as two identical members each being approximately hemispherical with heat dissipating fins formed as annuli extending substantially parallel to the polar axis of the member, each of said hemispherical members having molded at its pole an integral tubular extension and an equatorial rim, each rim having integrally formed therewith two half trunnions located diametrically opposite each other, the rim and trunnions of one member being identical with the rim and trunnions of the other member and mating therewith, securing means for holding said rims in mating engagement and combining the respective half trunnions, a lens system mounted in the tubular extension of one of said members, an electric lamp having its base mounted in the tubular extension of the other member, and a stand pivotally mounting said combined half trunnions.

References Cited in the file of this patent

UNITED STATES PATENTS

| | | |
|---|---|---|
| 1,153,161 | Hill | Sept. 7, 1915 |
| 1,256,522 | Croxton | Feb. 19, 1918 |
| 1,262,517 | Klein | Apr. 9, 1918 |
| 1,527,823 | Albert | Feb. 24, 1925 |
| 2,076,240 | Levy | Apr. 6, 1937 |
| 2,587,956 | Bastien | Mar. 4, 1952 |
| 2,739,228 | Robins | Mar. 20, 1956 |